United States Patent [19]

Smentek

[11] Patent Number: 5,180,540
[45] Date of Patent: Jan. 19, 1993

[54] FUEL ROD CONSOLIDATION STRUCTURE

[75] Inventor: Thomas J. Smentek, Forest, Va.

[73] Assignee: B&W Fuel Company, Lynchburg, Va.

[21] Appl. No.: 674,014

[22] Filed: Mar. 25, 1991

[51] Int. Cl.⁵ .................. G21C 19/00; G21F 5/008
[52] U.S. Cl. ......................... 376/261; 376/272
[58] Field of Search ............... 376/261, 272; 250/507.1, 506.1

[56] References Cited

U.S. PATENT DOCUMENTS

| | | | |
|---|---|---|---|
| 3,823,065 | 7/1974 | Jones | 376/272 |
| 4,636,351 | 1/1987 | Rohr | 376/261 |
| 4,659,535 | 4/1987 | Couture et al. | 376/261 |
| 4,680,159 | 7/1987 | Lahr et al. | 376/272 |
| 5,002,724 | 3/1991 | Elkins et al. | 376/440 |
| 5,039,474 | 8/1991 | Pickl et al. | 376/261 |
| 5,063,299 | 11/1991 | Efferding | 376/272 |

Primary Examiner—Daniel D. Wash
Attorney, Agent, or Firm—R. J. Edwards; D. Neil LaHaye

[57] ABSTRACT

A nuclear fuel rod consolidation structure. A storage canister has a grid structure positioned in its interior. The grid structure is provided with a plurality of hexagonally shaped individual cells in a triangular pitch array. This provides nearly a two to one consolidation ratio. The grid structure provides positive radial support to the fuel rods to maintain the triangular pitch array if the canister is not fully loaded or some of the fuel rods are removed. The positive guidance allows use of the existing rod pulling device for loading fuel rods into the structure.

7 Claims, 2 Drawing Sheets

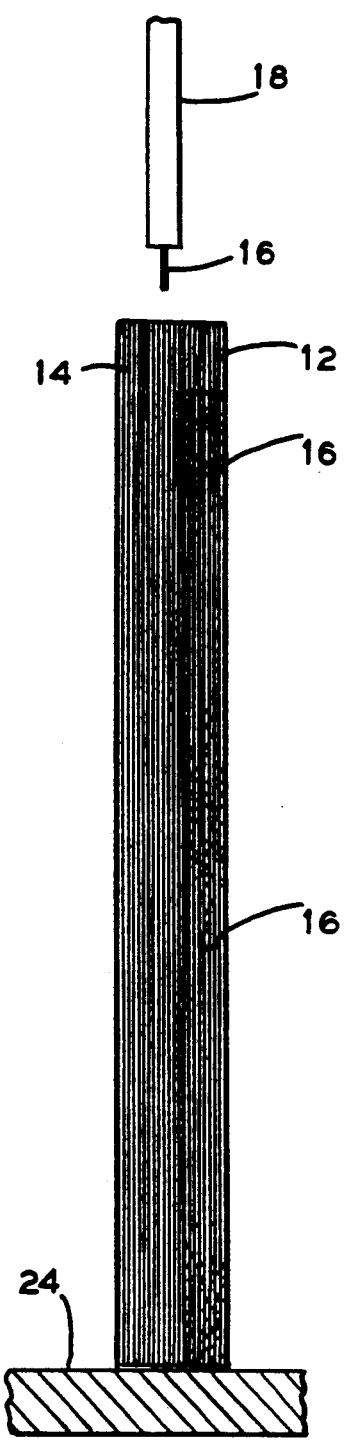
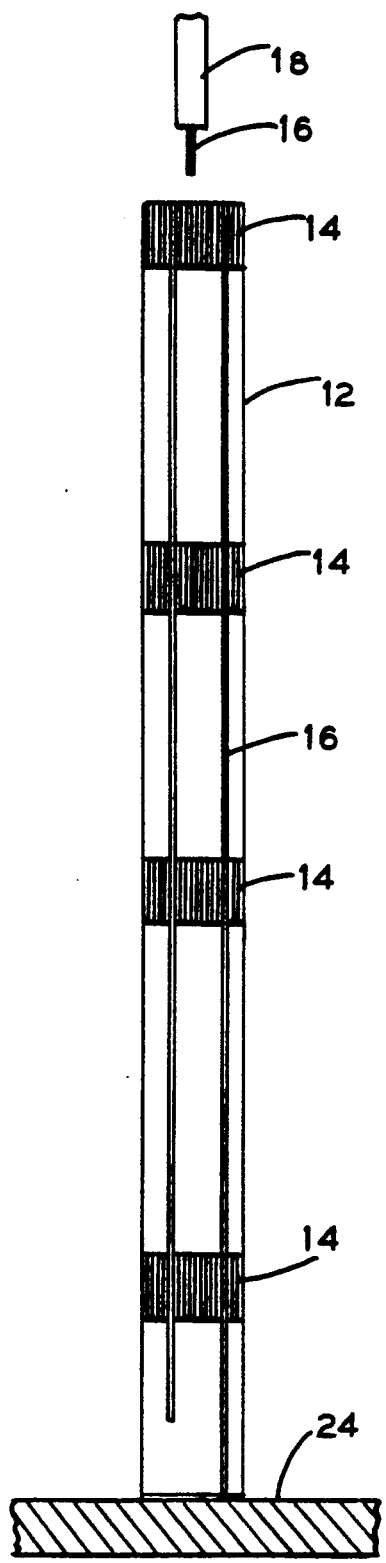

FUEL ROD CONSOLIDATION STRUCTURE

BACKGROUND OF THE INVENTION

1. Field of the Invention

The present invention is generally related to the storage of spent nuclear fuel and in particular to the consolidation and storage of spent fuel rods.

2. General Background

In commercial nuclear power plants, nuclear fuel assemblies are replaced at routine intervals as they are depleted in various locations to maintain the most efficient power level and power shaping within the core of the reactor. Due to limited or nonexistent fuel reprocessing facilities, each power plant must store these radioactive spent fuel rods on site until fuel reprocessing becomes available or the radioactivity has decayed to safe levels. Storage in water is necessary for radiation attenuation and removal of decay heat. The limited underwater storage space at commercial nuclear plants results in the need for the most efficient use of available space due to the number of fuel assemblies used during the projected life of the reactor. Efficient use of the space is achieved by removing the fuel rods from the grid assemblies and repacking the fuel rods with a minimum of spacing therebetween. This allows fuel rods from two fuel assemblies to be stored in a canister that only occupies the space that one fuel assembly would normally occupy. This consolidation ratio of 2 to 1 is achieved by packing the spent fuel rods closely together in a triangular pitch array. Patented approaches to this problem which applicant is aware of include the following.

U.S. Pat. No. 4,619,808 and U.S. Pat. No. 4,659,535 each disclose the use of a tapered transfer canister that receives the rods in a loosely packed rectangular array and rearranges the rods into a relatively tightly packed rectangular array at the lower end of the canister. The rods are then transferred to a storage container from the consolidation canister.

U.S. Pat. No. 4,659,536 and U.S. Pat. No. 4,683,110 disclose the use of flutes, springs, and a moving installation sheet for tightly packing rods in a triangular pitch array.

U.S. Pat. No. 4,636,351 discloses the use of a dense-packing device having clamping means for compressing the introduced fuel rods into a hexagonal array.

U.S. Pat. No. 4,441,242 discloses a consolidation system having a row ordering section for rearranging the configuration of the fuel rods, a horizontal consolidation section for horizontally compacting several rows of fuel rods, and a vertical consolidation section for vertically compacting several rows of horizontally compacted fuel rods.

U.S. Pat. No. 4,723,359 discloses a horizontal consolidation system that pivots a spent fuel assembly into a horizontal position and then pulls the fuel rods out into a horizontal position at a second station where they are reconfigured in the original square pitch formation into a more compact array.

U.S. Pat. No. 4,474,727 discloses a storage container for spent nuclear fuel rods having steps that support the fuel rods in a triangular array with the assistance of a movable guidance plate.

As seen from the above approaches, removing fuel rods in the square array in a fuel assembly and repacking them into a triangular pitch array is complicated by the fact that, when performed in a vertical orientation, gravity provides little or no benefit to packing the rods in a triangular pitch array. Performing these operations in a horizontal orientation is not always practical due to limited space in spent fuel pools. When loading a storage or transfer canister in the vertical orientation, the fuel rods must be guided and held in position to insure that they are held in the proper packing array until the canister is fully loaded. Difficulties in maintaining the close pack array also arise when there is a need to remove leaking fuel rods from a canister or there are insufficient rods to fully load a canister. The approaches above present large mechanical systems which are maintenance intensive due to the need to operate underwater and become increasingly more difficult to maintain the longer they are used due to contamination buildup. There exists a need for a fuel rod consolidation structure that occupies a minimum of space, that maintains rods in a triangular pitch array when only partially loaded or when a fuel rod is removed, and that requires little or no maintenance.

SUMMARY OF THE INVENTION

The present invention solves the above problems in a straightforward manner. What is provided is a consolidation canister into which the spent fuel rods are directly loaded with existing equipment without the need for a transfer container for initial packing of the fuel rods. Integral with the consolidation canister is a grid in the form of a honeycomb frame. The grid extends approximately one half the length of the consolidation canister from the top end of the canister. The grid provides positive guidance of a fuel rod over the length of the consolidation canister maintaining triangular pitch loading. There are no moving parts to wear, fail, and maintain. The grid provides sufficient support to the relatively flexible fuel rods so that the canister can be partially loaded and handled or several fuel rods removed from the canister without the need for additional braces to prevent the close pack array from being disrupted.

BRIEF DESCRIPTION OF THE DRAWINGS

For a further understanding of the nature and objects of the present invention reference should be had to the following description, taken in conjunction with the accompanying drawings, in which like parts are given like reference numerals, and wherein:

FIG. 4 is a side sectional view of an alternate embodiment of the invention.

FIG. 5 is a side sectional view of another alternate embodiment of the invention.

DETAILED DESCRIPTION OF THE PREFERRED EMBODIMENT

Figure 1:
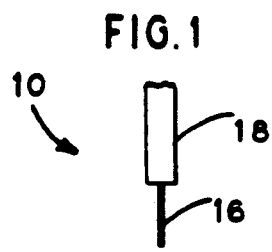
FIG. 1 is a side sectional view illustrating the invention in a spent fuel pool.

Referring to the drawings, it is seen in FIG. 1 that the invention is generally indicated by the numeral 10. Fuel rod consolidation structure 10 is generally comprised of storage canister 12 and grid structure 14.

Storage canister 12 is similar to standard storage containers for fuel rods in that the bottom forming the closed end has four side walls attached thereto at right angles to provide a substantially rectangular cross section. Fuel rods 16 are loaded into storage canister 12 through the open end using fuel rod puller 18.

Figure 2:
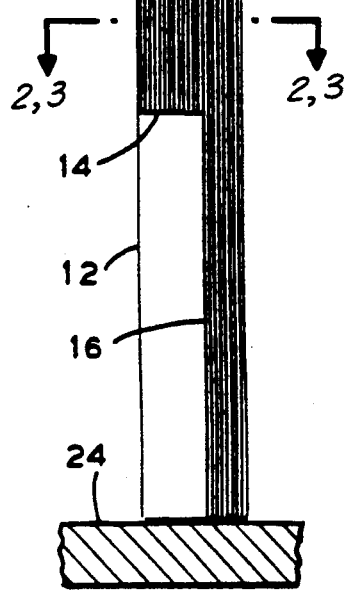
FIG. 2 is a view along the lines A—A of FIG. 1 illustrating the grid structure of the invention before fuel rods have been loaded therein.
Figure 2:
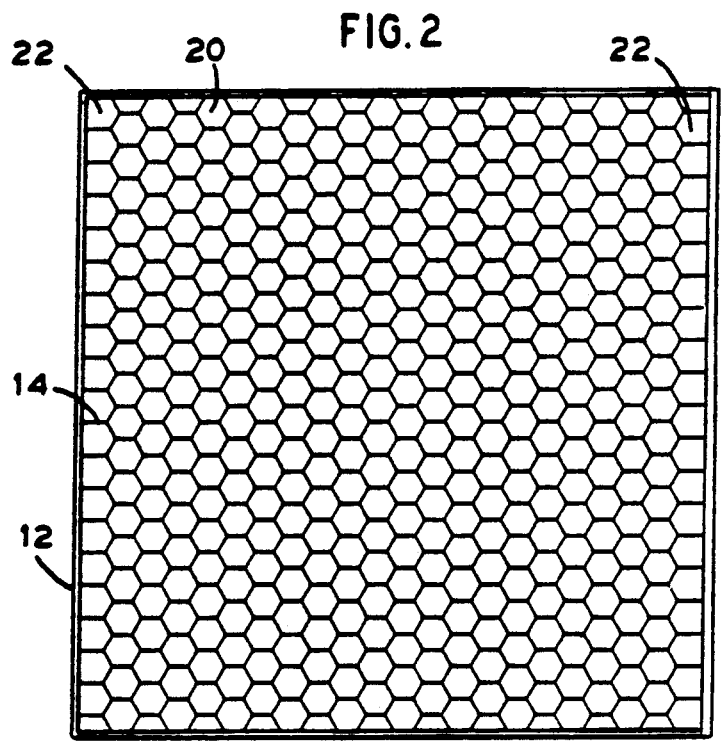
Figure 3:
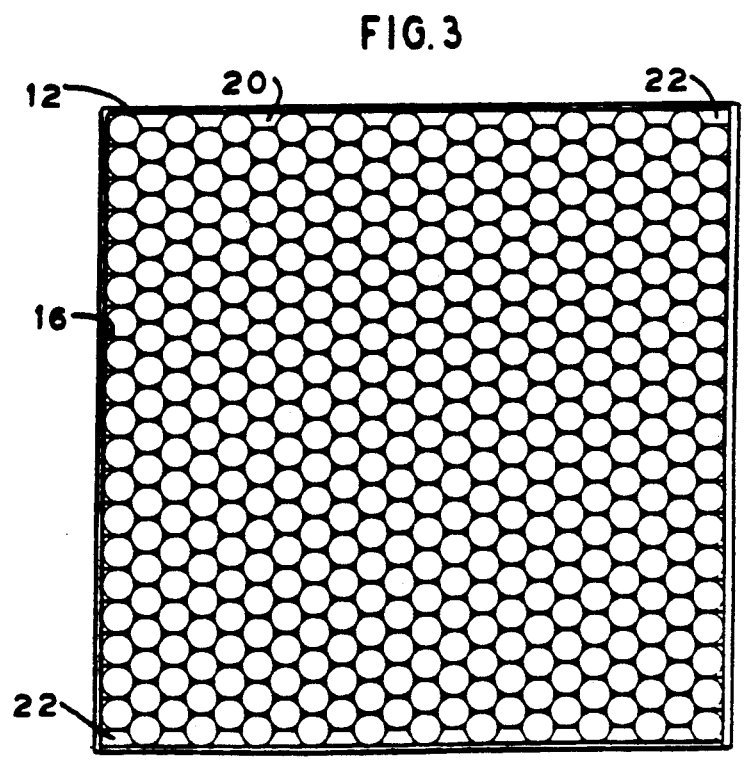
FIG. 3 is a view along the lines A—A of FIG. 1 illustrating the grid structure of the invention with fuel rods loaded therein.

A grid structure 14 is positioned so as to extend approximately through one half the length of canister 12 and may be attached to the inside of the walls so as to be integral therewith. In the preferred embodiment, grid structure 14 is positioned to extend downwardly along the interior of canister 12 from its top end. This is a sufficient length to provide positive guidance of fuel rods 16 as they are lowered into canister 12. As seen in FIG. 2 and 3, grid structure 14 is provided with a plurality of individual cells 20 arranged in a triangular pitch array for the most efficient use of space for fuel rod storage inside canister 12. Except for two rows of cells 22, one row each along opposing side walls of canister 12, cells 20 are of a hexagonal shape. The interconnecting strips that form grid 14 may be relatively thin since they are only required to radially support fuel rods 16 to maintain the triangular pitch array when canister 12 is not fully loaded. A thickness of approximately 0.007 inch is sufficient for this purpose. This provides a grid structure 14 with no moving parts that holds fuel rods 16 in place and that occupies a minimum of space in storage canister 12. Grid structure 14 may be formed from any material compatible with conditions in nuclear reactor spent fuel pools such as aluminum, stainless steel or other non-corrosive material. Fabrication may be from stamped strips welded together or molded plastic grids. Attachment of a metal grid to canister 12 can be by any suitable means such welding or using locking tabs while a plastic grid would use locking tabs.

FIG. 4 and 5 illustrates alternate embodiments of the invention. In FIG. 4, a single grid 14 having a plurality of individual cells identical to that in FIG. 1 extends the entire interior length of canister 12. This provides the same support to fuel rods 16 and can also eliminate the need for attaching grid 14 to canister 12 since it is supported on the bottom of canister 12. In FIG. 5, a plurality of grids 14 are spaced apart at intervals along the interior length of canister 12 and may be attached to the walls by any suitable means such as welding or by locking tabs. Each grid structure 14 is of a sufficient length to provide positive guidance of fuel rods 16 to the same relative cell 20 in the next grid structure 14 as fuel rod 16 is lowered into canister 12. The grids are positioned such that all corresponding cells 20 are in coaxial alignment. As seen in the drawing, the uppermost of the four grids 14 is preferably positioned adjacent the top of canister 12 to provide guidance to each fuel rod 16 immediately as it is lowered into canister 12 by fuel rod puller 18. Although four of grids 14 are shown, it should be understood that a greater or lesser number of grids may be used.

In operation, storage canister 12 is first placed on the bottom 24 of the spent fuel pool at the site. Fuel rod puller 18 is then used to remove fuel rods 16 from a fuel assembly not shown and to load them into storage canister 12. Grid structure 14 positions and holds the fuel rods in individual cells 20 in a triangular pitch array and provides a consolidation ratio of nearly two to one. The grid structure 14 is of a sufficient length so as to provide positive radial support to the fuel rods to maintain the triangular pitch array if canister 12 is not fully loaded or some of fuel rods 16 are removed. After loading is completed canister 12 is covered as is normally done.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

I claim:

1. A fuel rod consolidation structure, comprising:
   a. a storage canister;
   b. a grid structure that is attached to and extends downwardly from the top of said canister along a portion of the interior of said storage canister whereby said grid structure provides radial support to fuel rods loaded in said canister; and
   c. said grid structure having a plurality of individual cells positioned in a triangular pitch array with each cell sized to receive one nuclear fuel rod.

2. The structure of claim 1, wherein said grid structure extends approximately one half the length of said storage canister.

3. The structure of claim 1, wherein said grid structure extends approximately the full length of said canister.

4. A fuel rod consolidation structure, comprising
   a. a storage canister;
   b. a grid structure that is attached to and extends downwardly from the top of said canister along a portion of the interior of said storage canister whereby said grid structure provides radial support to fuel rods loaded in said canister; and
   c. said grid structure having a plurality of hexagonally shaped individual cells positioned in a triangular pitch array with each cell sized to receive one nuclear fuel rod.

5. A fuel rod consolidation structure, comprising:
   a. a storage canister;
   b. a plurality of grid structures spaced along the interior of said storage canister whereby said grid structures provide radial support to fuel rods loaded in said canister; and
   c. each of said grid structures having a plurality of individual cells positioned in a triangular pitch array in coaxial alignment with each cell sized to receive one nuclear fuel rod.

6. The structure of claim 5, wherein said individual cells are hexagonally shaped.

7. The structure of claim 5, wherein four of said grid structures are positioned in said canister with the uppermost grid structure being adjacent the top of said canister.

* * * * *